Aug. 6, 1957 L. C. SCHUBA 2,801,734
AUTOMATIC RULE DROPPING DEVICE FOR LINECASTING MACHINES
EQUIPPED WITH REMOTE CONTROL OPERATING MECHANISM
Filed Jan. 4, 1954 6 Sheets-Sheet 1

Inventor:
Leo C. Schuba
By: Carl X. Lloyd
Attorney

FIG.4

Aug. 6, 1957 L. C. SCHUBA 2,801,734
AUTOMATIC RULE DROPPING DEVICE FOR LINECASTING MACHINES
EQUIPPED WITH REMOTE CONTROL OPERATING MECHANISM
Filed Jan. 4, 1954 6 Sheets-Sheet 5

Inventor:
Leo C. Schuba
By: Carl V. Floyd
Attorney

United States Patent Office 2,801,734
Patented Aug. 6, 1957

2,801,734

AUTOMATIC RULE DROPPING DEVICE FOR LINECASTING MACHINES EQUIPPED WITH REMOTE CONTROL OPERATING MECHANISM

Leo C. Schuba, Chicago, Ill., assignor to Tribune Company, Chicago, Ill., a corporation of Illinois Application January 4, 1954, Serial No. 401,881

13 Claims. (Cl. 199—61)

This invention relates to linecasting apparatus, such as Linotype machines, which are used in newspaper printing plants for setting type in the customary process of stereotype printing, and particularly to machines of this character which are equipped with remote control operating mechanism, such as teletypesetter attachments. Its general object is to provide a semi-automatic device for dropping into the "stick" or galley in which the cast line slugs are assembled in such machines, the rules by which lines separating printed matter, such as classified ads, are printed. Heretofore the rules have customarily been inserted by hand after a number of ads have been set and removed from the machine. This manual operation is costly both in time and labor, and it is the primary purpose of the present invention to eliminate it by providing mechanical and electrical control mechanism to insert the rules at the proper time, as hereinafter described.

As is well known, in the operation of a Linotype machine without a teletypesetter attachment the operator assembles a line of matrices in an assembly elevator and the elevator is then raised by hand, lifting the line to a delivery slide position. Subsequent steps in operating the delivery slide, casting the lines and delivering the line slugs to the stick or galley are performed by mechanism that is quite complicated and need not be described in detail here.

When the machine is equipped with a teletypesetter attachment (which is a mechanical device designed for mounting on a slug linecasting machine, such as a Linotype machine, to provide automatic operation thereof), a paper tape, prepared by a keyboard-operated tape perforator, is employed to control many of the operations, including the actuation by mechanical means of the keyboard of the linecasting machine and the above-mentioned operation of raising of the assembly elevator. Holes punched in the tape by the perforator in various combinations (across the tape) serve not only to release matrices bearing letters of the alphabet but to operate switches for controlling a number of operations as the tape is advanced by means of a sprocket or star wheel engaging in holes on a center line in the tape.

In accordance with the present invention the rule dropping device is also actuated by mechanism controlled by the perforated tape in such manner as to cause dropping of a rule after the last line of each classified ad or other unit of printed matter. It has been found that this can be done with a standard teletypesetter code tape by utilizing a certain hole combination therein that is ordinarily not used for any other purpose. At the right time keys are operated on the keyboard that is used for perforating the tape to punch the holes that will initiate the action of the rule dropping mechanism and cause insertion into the galley of a rule following the last line slug for the want-ad or other unit of the matter to be printed. It is therefore an object of the invention to provide an automatic rule dropping device which can be actuated from the standard code tape used in apparatus of this character.

A further object of the invention is to provide, in combination with mechanical means for the purpose stated, an electrical system whereby a code signal after being given from the tape can be stored until a predetermined later time and then utilized to cause action of an ejector for discharging a rule from a tray or holder into the galley containing the line slugs.

A more particular object of the invention is to provide in such combination an electrical system by which the code signal can be stored while the machine makes one complete cycle of operation and can then be made effective to cause ejection of the rule during the next cycle.

Another object is to provide a device as and for the purpose above set forth in which mechanical elements that are present in standard linecasting machines can be utilized to actuate switches contained in the electrical system whereby the code signal is stored and utilized to effect the rule dropping operation at the desired time.

Other objects and advantages of the invention will be evident from the following description of a preferred embodiment thereof, taken in connection with the accompanying drawings, in which.

For an understanding of the "end product" or function of this apparatus, attention is first directed to Figs. 4 to 8 of the drawings showing the mechanical elements of the rule dropper and the manner in which the rules are delivered to the receiver (galley or stick) for the cast line slugs that are placed therein by standard mechanism, not shown.

Figure 4:
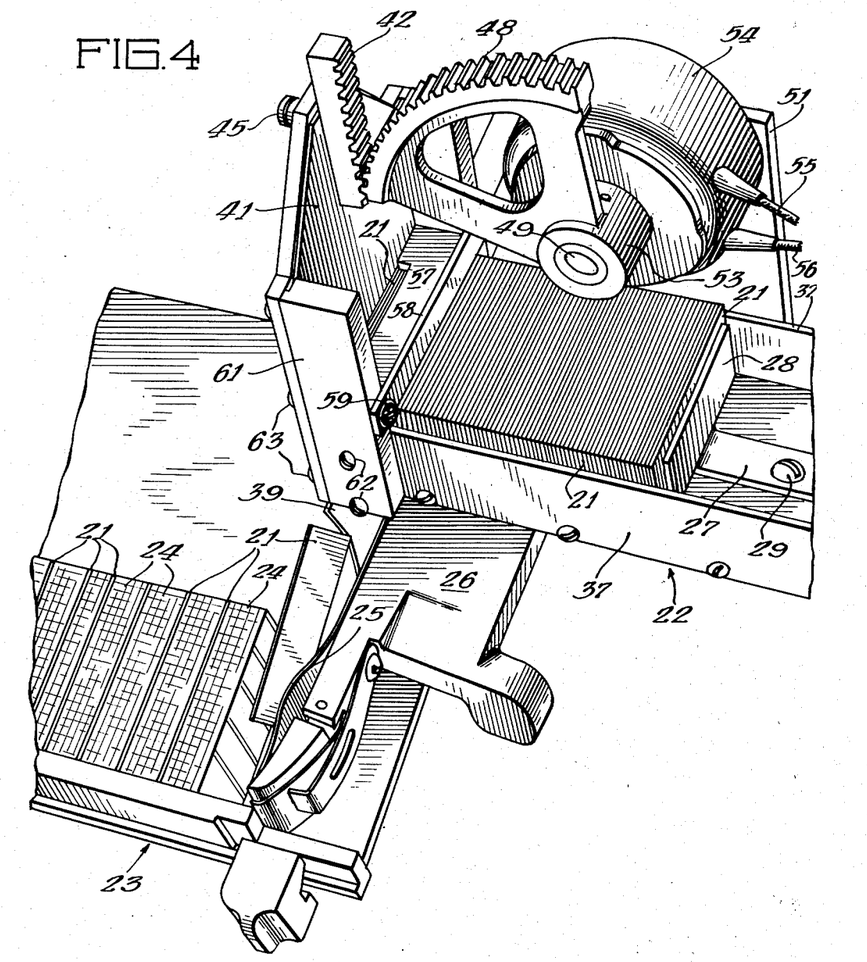
Fig. 4 is a perspective view of certain parts of the rule dropper of the invention, shown in its relationship to the line slug "stick" or galley, showing a rule dropping into the latter.
Figure 5:
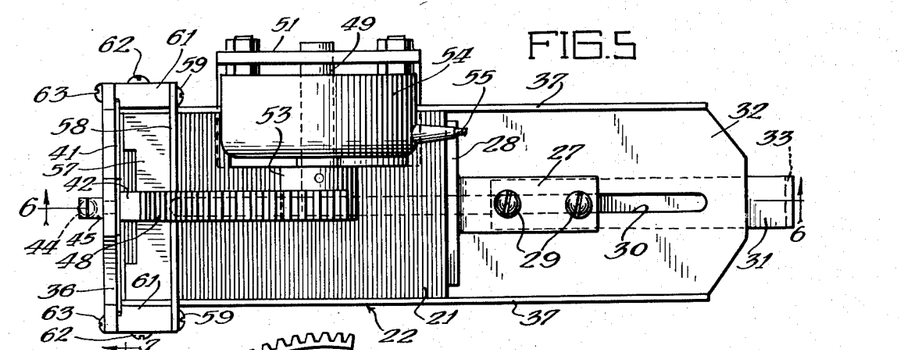
Fig. 5 is a top plan view of the rule holder or tray and of the ejector mechanism.

A supply of the rules 21, which are in the form of thin metal plates, is contained in a box or tray 22 which is mounted above and somewhat to one side of the line slug galley 23, in which some of the line slugs 24 are shown in Fig. 4. The assembly of slugs between rules, as shown in this figure, represent individual want-ads, which of course are of varying lengths. As the slugs and rules are fed into the galley they are assembled into a block, as shown in said Fig. 4, which is moved forward by pressure exerted through a curved spring 25 which is mounted on a hinged arm 26 that may be intermittently moved back and forth by mechanism that is not shown.

The rules 21 in the tray 22 are urged toward the front of the tray by means of a pusher 27 which has an upwardly-extending flange 28 on the front thereof and is connected by screws or pins 29 with a slidable bar 31 beneath the floor 32 of the tray 22, said pins extending through a slot 30 in the floor 32. Said bar 31 has a flange 33 at the rear thereof which is connected by a spring 34 to a stud 35 depending from the floor 32 near the front end thereof (see Figs. 5 and 6). The spring 34 thus holds the block of rules in forward position in the tray, with the leading rule in frictional engagement (under pressure of the spring) with a front wall 36 of the tray, the tray also having side walls 37 which hold the rules in alignment.

The floor 32 of the tray has a slot 38 therein just behind the front wall 36, and mechanism is provided to eject the forwardmost rule in the tray through this slot when such mechanism is actuated in manner that will be hereinafter described.

The ejected rule will thereupon drop into the galley 23 behind the last line slug therein, which, as above explained, will be the last line of a classified ad when such ads constitute the matter that is being printed. The rule will be guided in its fall by a guide or baffle member 39O and by an inclined track (not shown) forwardly of the spring 25; and, for convenience, the tray and galley, which, as above noted, are offset from each other, are, or may be, mounted at an angle to provide a downward inclination laterally from the tray to the galley.

The mechanism for ejecting the rules individually from the tray comprises an ejector plate 41 to the upper part of which a rack 42 is attached, as by screws 43. Said plate 41 is normally held in raised position by a spring 44 which is connected at its upper end to a stud 45 on the front wall 36 of the tray and at its lower end to a stud 46 protruding from the front of the plate 41. A slot 47 is provided in said front wall 36 of the tray to permit vertical travel of the stud 46.

Figure 6:
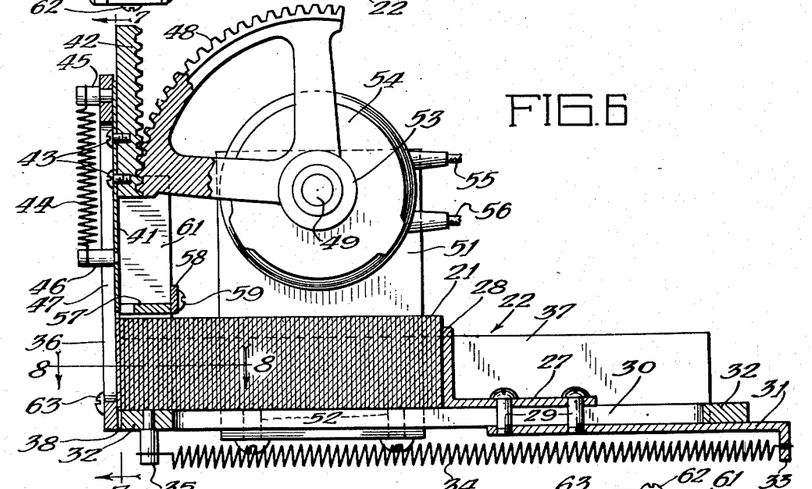
Fig. 6 is a longitudinal sectional view taken substantially on the section line 6—6 and looking in the direction of the arrows in Fig. 5.
Figure 7:
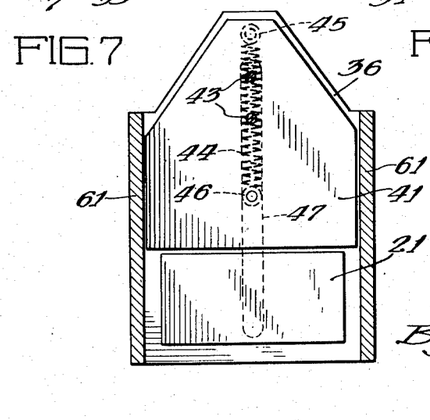
Fig. 7 is a vertical sectional view taken substantially on the section line 7—7 in Fig. 6.
Figure 8:
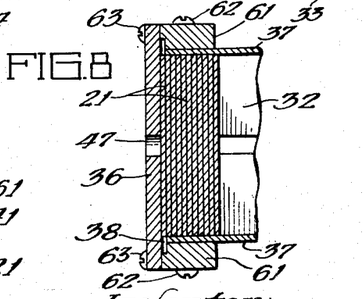
Fig. 8 is a sectional detail taken substantially on the line 8—8 in Fig. 6.

A segmental gear 48 is mounted on a shaft 49 which is bearinged in an upright 51 secured to the tray 22 in any suitable manner, as by screws 52 shown in Fig. 6. Said segmental gear, which has a hub 53 secured to the shaft 49, is in mesh with the rack 42 and is adapted to be actuated by means of a rotary solenoid 54 which is electrically connected by leads 55 and 56 into a circuit to be hereinafter described.

A stop member 57 is positioned above the rules 21 in the tray to prevent the next following rule from being raised with the slide 41 on its up stroke. Said stop member has thereon a flange 58, the ends of which are secured by screws 59 to brackets 61 which in turn are secured by screws 62 to the side walls 37 of the tray and by screws 63 to the front wall 36 thereof.

As will now be evident, downward movement of the ejector 41 will force the leading rule 21 in the tray through the slot 38 and cause the same to drop into the galley behind the last line slug 24 therein, as above mentioned. The block of slugs and rules may then be removed, if it constitutes a complete assembly, or, if not, it will be moved forward and additional line slugs and rules will be fed into the galley until the desired assembly is completed.

Figures 9, 10, 11:
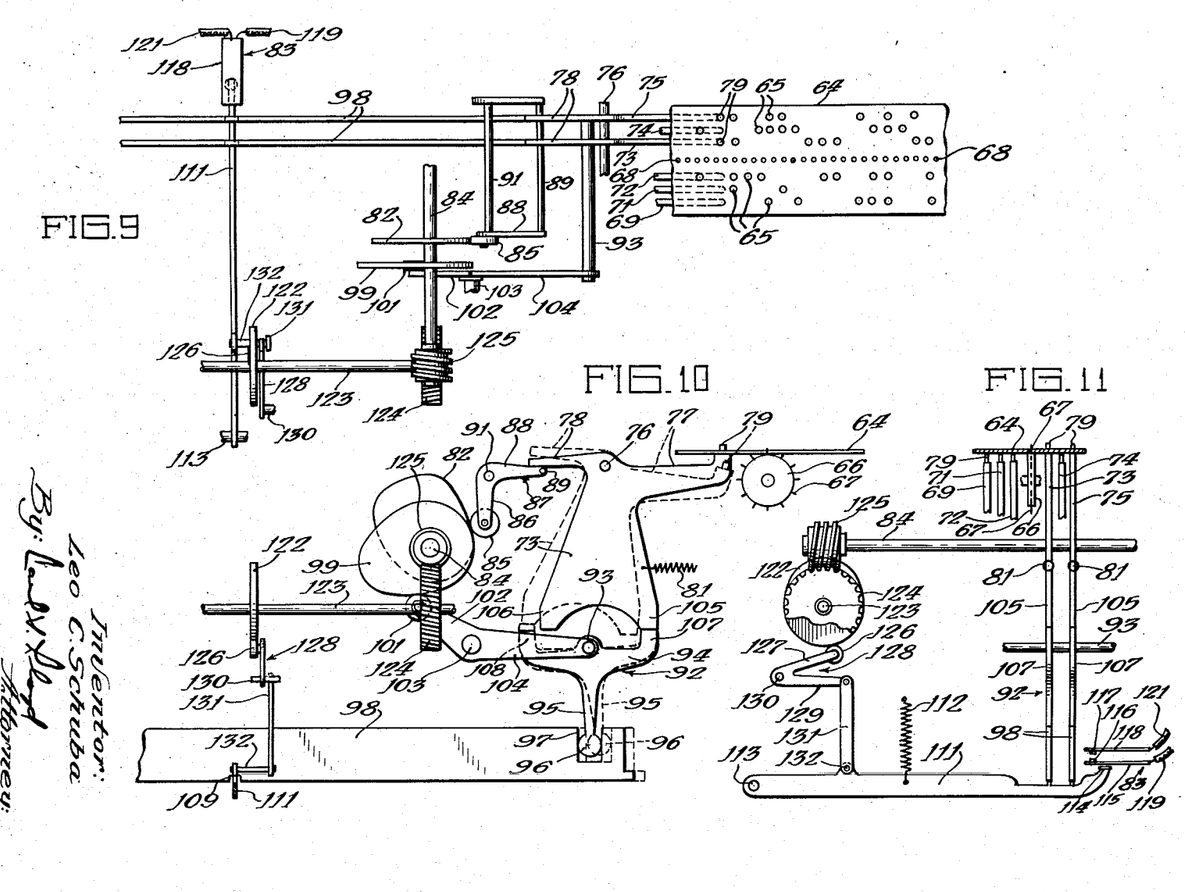
Fig. 9 is a rather diagrammatic top plan view of a fragment of the code tape of the remote control (teletypesetter) device and of the mechanism controlled thereby.
Fig. 10 is a side elevational view of certain of such mechanism, viewed from the side thereof in the lower part of Fig. 9, the mechanism also being shown more or less diagrammatically in this view.
Fig. 11 is an end elevational view of said mechanism taken from the right in Figs. 9 and 10.

For an understanding of the manner in which the rotary solenoid is energized to effect the rule dropping operation just described, attention is next directed to Figs. 9 to 11 of the drawings. In these figures a fragmentary section of the perforated code tape, indicated by the numeral 64, is shown. The holes, marked 65, in the tape are punched by a perforator forming a part of the teletypesetter, which may be located at some distance away from the linecasting (Linotype) machine. The tape is fed to the latter machine and is advanced therethrough by means of a sprocket wheel 66 driven in customary manner (not shown) and having prongs or pins 67 thereon engaging in holes 68 on a center line in the tape.

Mounted beneath the tape are six selector levers 69, 71, 72, 73, 74 and 75, of which two (73 and 75) are utilized for the rule dropping function of the present invention. These selector levers are pivotally mounted on shafts 76 and have arms 77 extending to the right of their pivot points and arms 78 extending to the left thereof (viewing Fig. 10). The arms 77 have upwardly extending pins 79 thereon adapted to enter the holes 65 as the latter are presented above the respective levers and as permitted by cam mechanism, some of which will be later described.

The selector levers are urged in counterclockwise direction (towards the tape) by springs 81 connected at one end to said levers below their pivot points and at the other end to a fixed point (not shown) on the frame of the machine. When the pins 79 on a plurality of the selector levers, in predetermined combinations, enter corresponding holes in the tape, various functions of the machine are performed. In accordance with the present invention, the combination comprising the levers 73 and 75 and the two holes 65 in the tape in the first and third horizontal lines (counting from the top in Fig. 9), with no other holes in the transverse line in which these two appear, is the combination that is utilized to perform the rule dropping operation. These two holes (and no others) are punched in the tape by the key-operated perforator at the point in the sequence at which a rule is to be dropped, namely at the end of a want-ad or other unit of printed matter.

When this combination of holes is presented above the selector levers 73 and 75, and the latter are permitted by a selector cam 82 to move in counterclockwise direction under the influence of the springs 81, said levers 73 and 75 move to the full-line position shown in Figs. 9–11. This results in closing an operating signal switch 83 (see Figs. 9, 11, 12 and 14) in manner which will presently be described.

It should be noted first, however, that the cam 82 is carried on a shaft 84 driven from a source not shown and a cam roller 85 is carried by one arm 86 of a bell-crank lever 87, the other arm 88 of which carries a bail 89 disposed beneath the arms 78 of the selector levers 69 and 71—75, the bell-crank lever 87 being supported on a shaft 91. With the roller 85 on the low part of the cam 82, thus permitting the pins 79 on the levers 73 and 75 to enter the two corresponding holes in the tape, and with none of the other selector levers actuated (due to the absence of holes 65 in the tape to receive them), only the two levers, 73 and 75, will be in the full-line position shown in Figs. 9–11 of the drawings, as above noted.

Beneath the selector levers 69 and 71—75 there are a corresponding number of transfer levers 92 mounted on a shaft 93, each having a bifurcated upper portion 94 and a downward extension 95 terminating in a rounded portion or ball 96 disposed in a recess 97 of a code bar 98. There are six of these code bars corresponding to the number of selector levers and transfer levers and they are disposed beneath the transfer levers, as shown.

The transfer levers are actuated from a transfer cam 99 on the shaft 84 through a roller 101 on an arm 102 carried by a shaft 103 which also carries an arm 104 connected at its outer end with the shaft 93. When the roller 101 rides to the high point of the cam 99, the transfer levers will be moved upwardly against the selector levers, which, as will be observed from Fig. 10, have lower right and left extensions 105 and 106 corresponding, respectively, to the right and left arms (numbered 107 and 108) on the transfer levers. The operated selector levers (i. e., those which have their pins 79 extending through the corresponding holes 65 in the code tape 64) will have their right extensions 105 in line with the right arms 107 of the companion transfer levers. The unoperated selector levers will have their lower left extensions 106 in line with the left arms 108 of the corresponding transfer levers. Thus, upon upward movement of the transfer levers, those engaging the operated selector levers will be rotated in clockwise direction and those engaging the unoperated selector levers will be rotated in counterclockwise direction. The transfer levers that are rotated in clockwise direction will move the associated code bar links 98 from right to left, viewing Figs. 9 and 10, and those that are rotated counterclockwise will move the links that correspond to them from left to right.

The code bar links are provided with notches 109 on their under sides and a switch operating lever 111 is so positioned beneath the links (at a right angle thereto) that when the selector levers and transfer levers are operated pursuant to the rule dropping signal (as above described), said lever 111 will enter said notches, into which it is drawn by a spring 112 secured to the lever at a mid-point between the pivot 113 thereof and its outer end and to a fixed point on the frame. The lever 111 has an upturned end 114 adapted to engage the lower blade 115 of the normally open switch 83 to move the contact 116 thereon into engagement with the contact 117 on the upper fixed blade 118 of the switch, said blades 115 and 118 having leads 119 and 121, respectively, connecting them into an electric circuit, to be later described, whereby the rotary solenoid 54 of the rule dropper of my invention is energized.

Said switch 83 is thereafter opened by means of a cam 122 on a shaft 123 which is driven from the shaft 84, to which it is geared by a worm wheel 124 and a worm 125 carried, respectively, by said shafts. Said cam 122 actuates the lever 111 through a roller 126 carried on an upper arm 127 of a bell-crank lever 128, pivoted on a shaft 130, the lower arm 129 of said bell-crank lever being connected to a link 131 which is pinned to the lever 111 by a pin 132. The opening of said switch 83 by this mechanism conditions the apparatus for the next operation.

Figure 12:
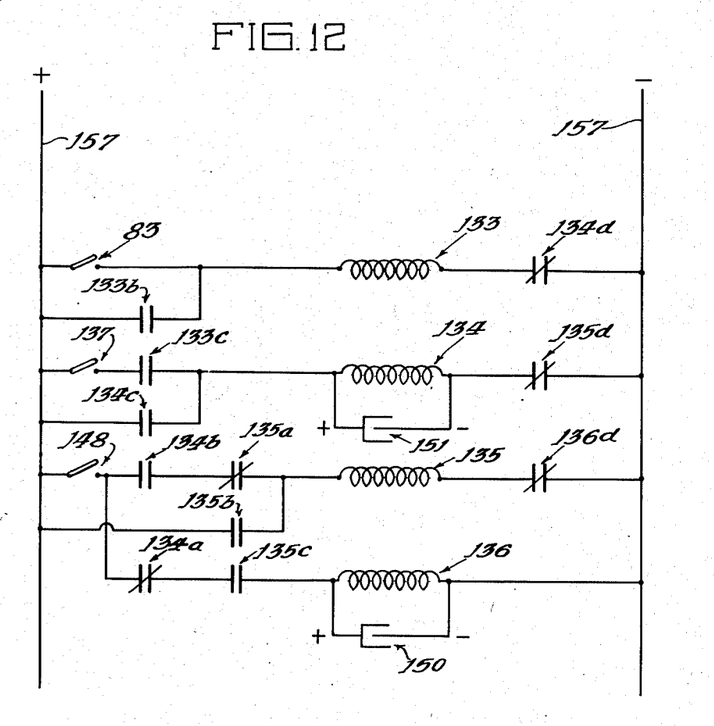
Fig. 12 is a schematic wiring diagram of the electrical system for relaying and storing the code signal by which the rule ejector is operated.
Figure 13:
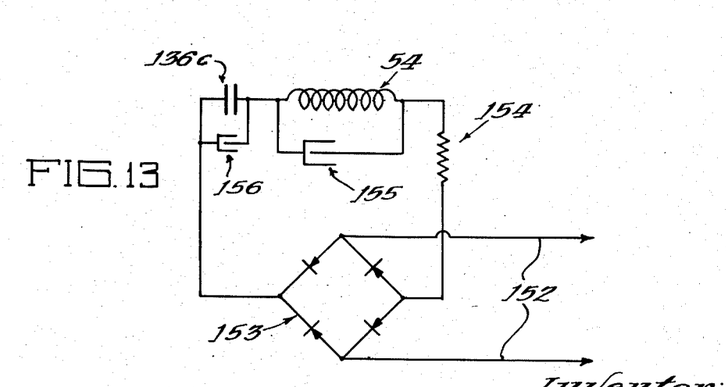
Fig. 13 is a similar diagram of a rotary solenoid and related electrical elements for operating the ejector, this view being practically a part or continuation of Fig. 12.
Figure 14:
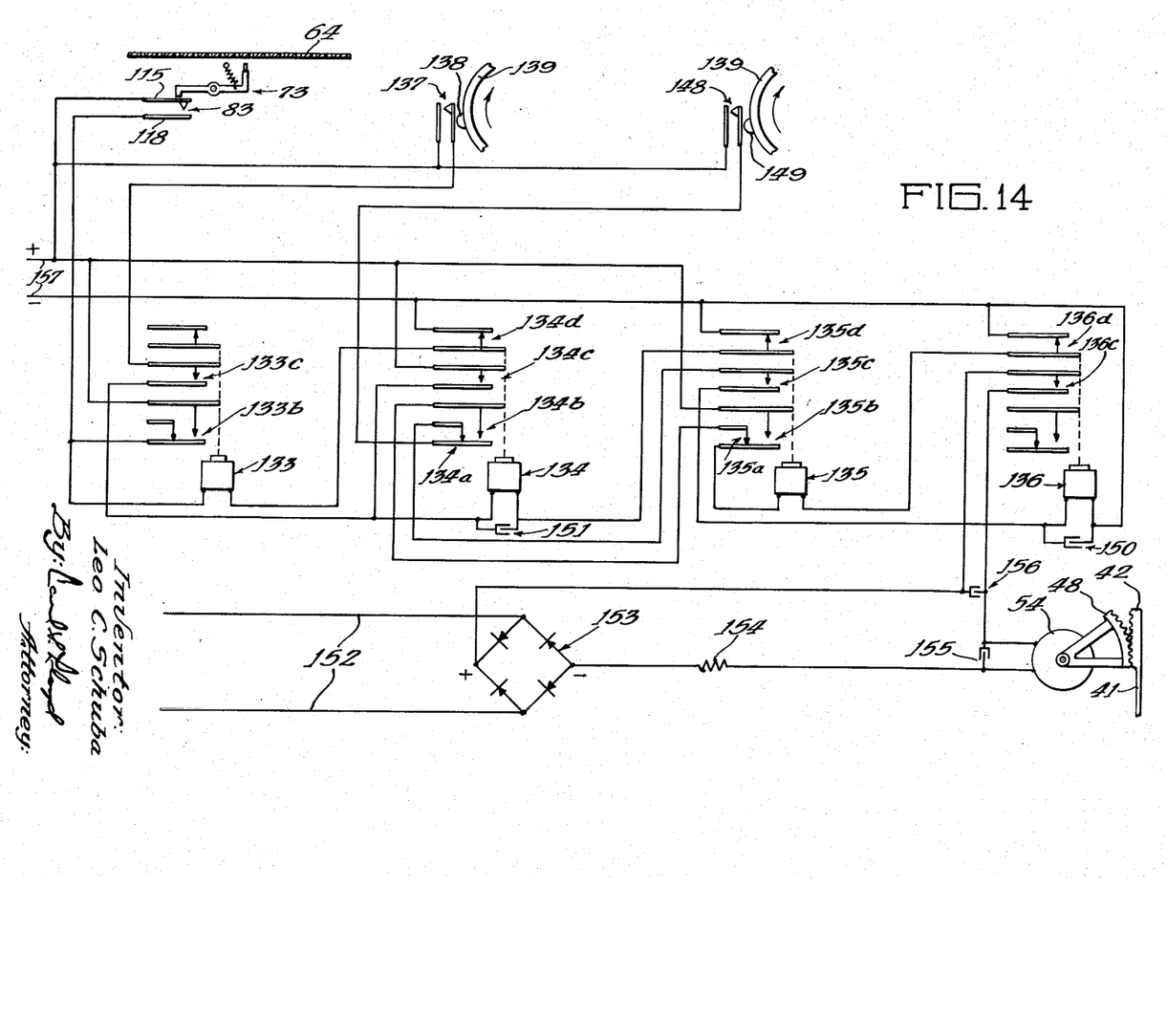
Fig. 14 is a line diagram of the electrical system, showing, also in diagrammatic form, certain of the actuating and actuated mechanical elements of the apparatus of my invention.

Referring now to the wiring diagrams comprising Figs. 12–14 of the drawings, it will be noted that the switch 83 is shown diagrammatically in Figs. 12 and 14, at the upper left-hand corner of each figure. When the teletypesetter operator uses the spare key on the tap perforator to punch the holes in the first and third lines only of the tape, and the latter causes said switch 83 to be closed in the manner hereinabove described, this will energize the first of four relays in the circuit, numbered 133, 134, 135, 136, respectively. Such closing of the switch 83 takes place before the casting cycle of the linecasting machine begins and the signal is stored during one complete cycle of said machine until the rule is to be ejected during the next cycle. The stored signal progresses through the four memory relays 133—136 in four steps as will now be described.

(1) The energizing of the relay 133 closes a contact 133b to provide a holding circuit through said relay 133. It also closes a contact 133c which is in the circuit of the relay 134 and is thus utilized for purposes of the next function of the electrical system.

Figures 1, 2:
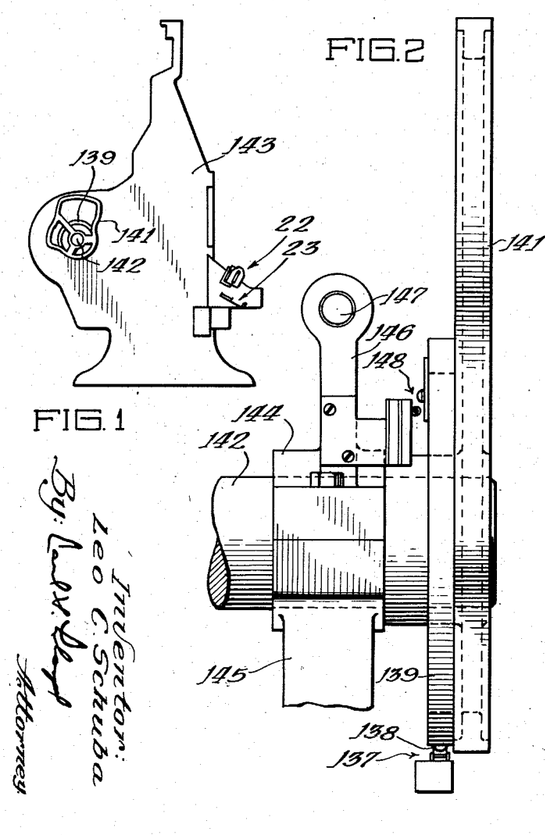
Fig. 1 is a general elevational view, in outline only, of a linecasting (Linotype) machine with which the device of my invention may be used.
Fig. 2 is a side elevation of the standard elevator cam and cam wheel of such a machine, with added cam elements on the wheel and related switches forming a part of the control system of the invention.
Figure 3:
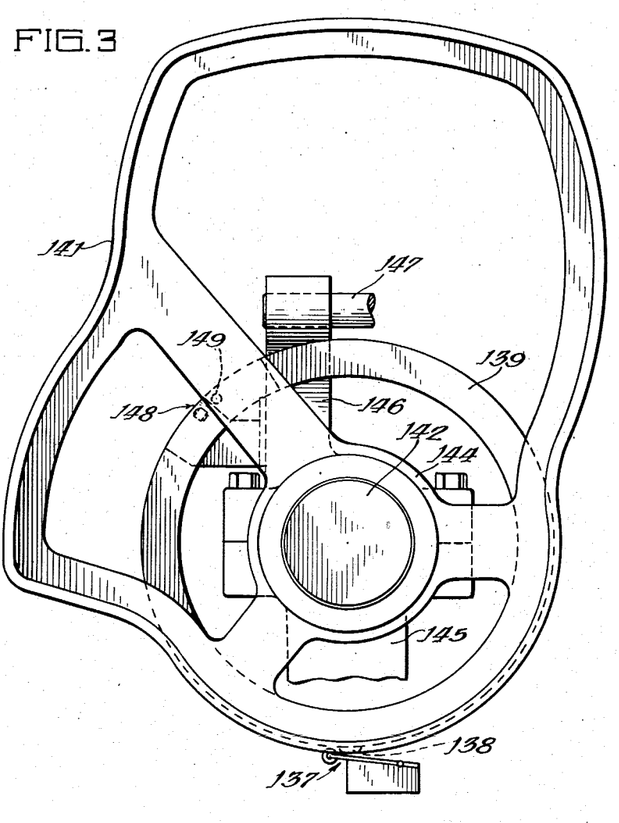
Fig. 3 is a face view of the same parts, taken from the right in Fig. 2.

(2) Shortly after the machine starts its casting cycle, a switch 137 is closed by a cam projection 138 on a wheel 139 on which a cam member 141 (constituting one of the standard cams of the Linotype machine) is also carried. (See Figs. 1–3.) Said wheel 139 and cam member 141 are mounted on a protruding part of a shaft 142 of the standard machine, the frame 143 of which is shown in outline in Fig. 1. The end portion of said shaft 142 on which said wheel 139 and cam member 141 are carried is journaled in a bearing 144 supported by brackets 145 and 146, the latter depending from a shaft 147 forming a part of the framework of the machine. The cam projection 138, in the embodiment shown, is so located on the wheel 139 that it closes the switch 137 momentarily 2 degrees after the machine starts its casting cycle. Such momentary closing of said switch 137 energizes the relay 134 through the now closed contact 133c. The operation of said relay 134 closes contacts 134b and 134c and opens contacts 134a and 134d. The opening of contact 134d deenergizes the relay 133, while contact 134c retains energy on relay 134. The contact 134b is in the circuit of relay 135. The opening of contact 134a prevents relay 136 from being energized on the first cycle of the machine, as will later appear.

(3) When the wheel 139 has turned 352 degrees on the first cycle of the machine, a second cam switch, numbered 148, is closed momentarily by a second cam projection 149 on the wheel 139, and energizes the relay 135 through the now closed contact 134b. The energizing of this relay closes contacts 135b and 135c and opens contacts 135a and 135d. Closed contact 135b retains energy on relay 135. The contact 135c is in the circuit of relay 136. The opening of contact 135d deenergizes relay 134, which has a delayed drop-out due to a capacitor 151 in the circuit. This delay is long enough to prevent the contact 134a from closing and energizing relay 136 when cam switch 148 closes on the first cycle of the machine.

(4) When the actuating cam projection 149 on the cam wheel 139 reaches the 352° position on the second cycle of the machine, the cam switch 148 again closes momentarily. This time the relay 136 is energized through the now closed contact 135c. The energizing of this relay closes contact 136c and opens contact 136d. The opening of contact 136d deenergizes relay 135 and the closing of contact 136c energizes the rotary solenoid 54 to cause actuation of the rule ejector 41. A capacitor 150 is connected across the relay 136 to sustain energy in said relay for a moment and thus maintain the contact at 136c long enough to insure the energizing of the solenoid 54.

The energy for operating the rotary solenoid 54 is derived from a 110 volt A. C. source 152 through a rectifier 153 and resistor 154 which, respectively, convert the A. C. to D. C. current and limit the voltage to approximately 70 volts, at which the rotary solenoid is operated. A capacitor 155 is connected across the solenoid leads to sustain the operation for a sufficient length of time to complete the ejecting of the rule. Another capacitor, numbered 156, is employed to eliminate arcing at the contacts of switch 136c.

The relays 133—136 are operated from an 18 volt D. C. source which is indicated at 157.

It will now be evident that the rule dropping device of my invention is operated to insert the rules semi-automatically by control elements that, for the most part, are already present in a linecasting (Linotype) machine with remote control (teletypesetter) attachment, and the slow and inefficient manual insertion of the rules, as in the prior practice, is eliminated.

While I have illustrated and described a preferred embodiment of my invention, it will be evident that many modifications may be made without departing from the spirit of the invention, and I do not wish to be limited to the precise details of the construction set forth but desire to include herein all changes within the scope of the appended claims.

I claim:

1. A rule dropping device for linecasting machines, as used in newspaper printing, equipped with remote control operating mechanism, comprising: a line slug receiver; a rule holder; a rule ejector; actuating means for said ejector; and further means, including code-tape-controlled elements comprising part of said remote control operating mechanism and an electrical linkage in part controlled by said mechanism, for operating said actuating means from a remote position to cause transfer at a selected time of a rule from said rule holder into said line slug receiver following the last line of an assembly of slugs from which a unit of printed matter is to be printed.

2. A rule dropping device for linecasting machines, as used in newspaper printing, equipped with remote control operating mechanism and having rotary elements provided with circuit closers, comprising: a line slug receiver; a rule holder; a rule ejector; actuating means for said ejector; and further means, including code-tape-controlled mechanical devices forming a part of said remote control operating mechanism and electrical means controlled by said devices and said circuit closers, for operating said actuating means from a remote position to cause transfer at a selected time of a rule from said rule holder into said line slug receiver following the last line of an assembly of slugs from which a unit of printed matter is to be printed.

3. A rule dropping device for linecasting machines, as used in newspaper printing, equipped with remote control operating mechanism, comprising: a line slug receiver; a rule holder; a rule ejector; actuating means for said ejector; and further means, including code-tape-controlled devices forming a part of said remote control operating mechanism and electrical means actuated by operation of said devices resulting from specially provided perforations in the code tape, for operating said actuating means to cause transfer at a selected time of a rule from said rule holder into said line slug receiver following the last line of an assembly of slugs from which a unit of printed matter is to be printed.

4. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled elements forming a part of said remote control operating mechanism, for operating said actuating means from a remote position to cause transfer at a selected time of a rule from said rule holder into said line slug receiver following the last line of an assembly of slugs from which a unit of printed matter is to be printed, said further means also including a signal switch arranged to be closed by a signal imparted by said remote control operating mechanism and a series of relays interposed between said switch and said electrical actuating means for transmitting said signal to said actuating means and causing the same to be energized to actuate the rule ejector.

5. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled elements forming a part of said remote control operating mechanism, for operating said actuating means from a remote position to cause transfer at a selected time of a rule from said rule holder into said line slug receiver following the last line of an assembly of slugs from which a unit of printed matter is to be printed, said further means also including a signal switch arranged to be closed by a signal imparted by said remote control operating mechanism, a series of relays interposed between said switch and said electrical actuating means for transmitting said signal to said actuating means and causing the same to be energized to actuate the rule ejector, and means for storing said signal in said series of relays and thus delaying the operation of said actuating means.

6. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled elements forming a part of said remote control operating mechanism, for operating said actuating means from a remote position to cause transfer at a selected time of a rule from said rule holder into said line slug receiver following the last line of an assembly of slugs from which a unit of printed matter is to be printed, said further means also including a signal switch arranged to be closed by a signal imparted by said remote control operating mechanism, a series of relays interposed between said switch and said electrical actuating means for transmitting said signal to said actuating means and causing the same to be energized to actuate the rule ejector, and means for storing said signal in said series of relays during one cycle and into a second cycle of operation of the machine, thus delaying the operation of said actuating means until such second cycle.

7. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled devices forming a part of said remote control operating mechanism and controlled by specially provided perforations in the tape; and, for operating said actuating means to cause transfer at a selected time of a rule from said rule holder into said line slug receiver following the last line of an assembly of slugs from which a unit of printed matter is to be printed, said further means also including a signal switch arranged to be closed by a signal imparted by said remote control operating mechanism and a series of relays interposed between said switch and said electrical actuating means for transmitting said signal to said actuating means and causing the same to be energized to actuate the rule ejector.

8. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled devices forming a part of said remote control operating mechanism and comprising selector and transfer levers, controlled by specially provided perforations in the tape for operating said actuating means to cause transfer at a selected time of a rule from said rule holder into said line slug receiver following the last line of an assembly of slugs from which a unit of printed matter is to be printed, said means for operating said actuating means also including a signal switch arranged to be closed by operation of said levers, a cam switch, cam means on said machine for closing said cam switch, and an electrical relay system arranged to be energized by the closing of said switches to energize said electrical actuating means and cause the same to actuate said ejector.

9. A rule dropping device for linecasting machines, as used in newspaper printing, equipped with remote control operating mechanism, comprising: a line slug receiver; a rule holder; a rule ejector; electrical actuating means for said ejector; and further means, including code-tape-controlled devices forming a part of said remote control operating mechanism and controlled by specially provided perforations in the tape for operating said actuating means to cause transfer at a selected time of a rule from said rule holder into said line slug receiver following the last line of an assembly of slugs from which a unit of printed matter is to be printed, said further means also including selector levers and transfer levers controlled by said perforated tape, a signal switch arranged to be closed by operation of said levers and electrical relay means arranged to be conditioned for operation by the closing of said switch to cause energization of said electrical actuating means.

10. A rule dropping device for linecasting machines, as used in newspaper printing, equipped with remote control operating mechanism, comprising: a line slug receiver; a rule holder; a rule ejector; electrical actuating means for said ejector; further means, including code-tape-controlled devices forming a part of said remote control operating mechanism and controlled by specially provided perforations in the tape, for operating said actuating means to cause transfer at a selected time of a rule from said rule holder into said line slug receiver following the last line of an assembly of slugs from which a unit of printed matter is to be printed, said further means also including selector levers and transfer levers controlled by said perforated tape, a signal switch arranged to be closed by operation of said levers and electrical relay means arranged to be conditioned for operation by the closing of said switch to cause energization of said electrical actuating means; cam switches for causing energization of certain elements of said relay means; and cam means for closing said cam switches to cause advance of an electrical signal through said relay means in such timed sequence as to cause a delayed action in the operation of said relay means.

11. A rule dropping device for linecasting machines, as used in newspaper printing, equipped with remote control operating mechanism, comprising: a line slug receiver; a rule holder; a rule ejector; electrical actuating means for said ejector; further means, including code-tape-controlled devices forming a part of said remote control operating mechanism and controlled by specially provided perforations in the tape, for operating said actuating means to cause transfer at a selected time of a rule from said rule holder into said line slug receiver following the last line of an assembly of slugs from which a unit of printed matter is to be printed, said further means also including selector levers and transfer levers controlled by said perforated tape, a signal switch arranged to be closed by operation of said levers and electrical relay means arranged to be conditioned for operation by the closing of said switch to cause energization of said electrical actuating means; cam switches for causing energization of certain elements of said relay means; and cam means for closing said cam switches to cause advance of an electrical signal through said relay means in such timed sequence as to cause a delayed action in the operation of said relay means, said linecasting machine having a rotating element as part of its standard construction and said cam means being carried by said rotating element.

12. A rule dropping device for linecasting machines, as used in newspaper printing, equipped with remote control operating mechanism, comprising: a line slug receiver; a rule holder; a rule ejector; actuating means for said ejector; and further means, including code-tape-controlled elements forming a part of said remote control operating mechanism, cam elements on said machine, and electrical means, including switches operated by said cam elements, for operating said actuating means from a remote position to cause transfer at a selected time of a rule from said rule holder into said line slug receiver following the last line of an assembly of slugs from which a unit of printed matter is to be printed.

13. A rule dropping device for linecasting machines, as used in newspaper printing, equipped with remote control operating mechanism, comprising: a line slug receiver; a rule holder; a rule ejector; electrical actuating means for said ejector; further means, including code-tape-controlled devices forming a part of said remote control operating mechanism and controlled by specially provided perforations in the tape for operating said actuating means to cause transfer at a selected time of a rule from said rule holder into said line slug receiver following the last line of an assembly of slugs from which a unit of printed matter is to be printed, said further means also including selector levers and transfer levers controlled by said perforated tape, a signal switch arranged to be closed by operation of said levers and electrical relay means arranged to be conditioned for operation by the closing of said switch to cause energization of said electrical actuating means; cam switches for causing energization of certain elements of said relay means; and cam means for closing said cam switches to cause advance of an electrical signal through said relay means in such timed sequence as to cause a delayed action in the operation of said relay means, said relay means and said cam means being arranged to cause the holding an electrical signal from one cycle of operation of the machine until a second cycle and to thus cause transfer and dropping of the rule during said second cycle.

References Cited in the file of this patent

UNITED STATES PATENTS

| | | |
|---|---|---|
| 652,422 | Burg | June 28, 1900 |
| 1,026,243 | Drewell | May 14, 1912 |
| 1,193,388 | Hockman | Aug. 1, 1916 |
| 1,925,968 | Padgett et al. | Sept. 5, 1933 |
| 2,180,410 | Geissel | Nov. 21, 1939 |